(12) United States Patent
Lee et al.

(10) Patent No.: US 11,795,258 B2
(45) Date of Patent: Oct. 24, 2023

(54) METHOD FOR PREPARING CORE-SHELL COPOLYMER, CORE-SHELL COPOLYMER PREPARED THEREFROM AND RESIN COMPOSITION INCLUDING THE SAME

(71) Applicant: LG Chem, Ltd., Seoul (KR)

(72) Inventors: Chang No Lee, Daejeon (KR); Yoon Ho Kim, Daejeon (KR); Sang Il Nam, Daejeon (KR); Kyung Bok Sun, Daejeon (KR); Kwang Jin Lee, Daejeon (KR)

(73) Assignee: LG Chem, Ltd.

( * ) Notice: Subject to any disclaimer, the term of this patent is extended or adjusted under 35 U.S.C. 154(b) by 808 days.

(21) Appl. No.: 16/645,348

(22) PCT Filed: Jul. 10, 2019

(86) PCT No.: PCT/KR2019/008499
§ 371 (c)(1),
(2) Date: Mar. 6, 2020

(87) PCT Pub. No.: WO2020/013605
PCT Pub. Date: Jan. 16, 2020

(65) Prior Publication Data
US 2020/0339721 A1    Oct. 29, 2020

(30) Foreign Application Priority Data

Jul. 13, 2018  (KR) .................. 10-2018-0081388
Jul. 9, 2019   (KR) .................. 10-2019-0082622

(51) Int. Cl.
| | | |
|---|---|---|
| C08F 265/06 | (2006.01) | |
| C08L 33/12  | (2006.01) | |
| C08F 220/14 | (2006.01) | |
| C08F 212/08 | (2006.01) | |
| C08L 27/06  | (2006.01) | |
| C08K 5/11   | (2006.01) | |

(52) U.S. Cl.
CPC .......... *C08F 265/06* (2013.01); *C08F 212/08* (2013.01); *C08F 220/14* (2013.01); *C08L 33/12* (2013.01); *C08K 5/11* (2013.01); *C08L 27/06* (2013.01); *C08L 2207/53* (2013.01); *C08L 2312/00* (2013.01)

(58) Field of Classification Search
CPC .... C08F 265/06; C08F 212/08; C08F 220/14; C08L 33/12; C08L 2207/53
See application file for complete search history.

(56) References Cited

U.S. PATENT DOCUMENTS

| | | | |
|---|---|---|---|
| 5,212,251 A    | 5/1993  | Lorah et al. | |
| 5,922,334 A *  | 7/1999  | Krasnansky | A61K 8/8152 |
| | | | 424/61 |
| 2004/0116580 A1 | 6/2004 | Sakashita et al. | |
| 2018/0142094 A1 | 5/2018 | Kang et al. | |
| 2018/0355161 A1 | 12/2018 | Ahn et al. | |

FOREIGN PATENT DOCUMENTS

| | | |
|---|---|---|
| JP | 2011195809 A | 10/2011 |
| KR | 19920006386 A | 4/1992 |
| KR | 20010015640 A | 2/2001 |
| KR | 20040047510 A | 6/2004 |
| KR | 20090078668 A | 7/2009 |
| KR | 20100105984 A | 10/2010 |
| KR | 20110088803 A | 8/2011 |
| KR | 20140096748 A | 8/2014 |
| KR | 20160119936 A | 10/2016 |
| KR | 20170068746 A | 6/2017 |
| KR | 20170132409 A | 12/2017 |
| KR | 20170142763 A | 12/2017 |
| KR | 20180047949 A | 5/2018 |

OTHER PUBLICATIONS

Search report from International Application No. PCT/KR2019/008499, dated Oct. 11, 2019.

* cited by examiner

*Primary Examiner* — Ling Siu Choi
*Assistant Examiner* — David L Miller
(74) *Attorney, Agent, or Firm* — Lerner David LLP

(57) ABSTRACT

A method for preparing a core-shell copolymer includes polymerizing a core by polymerizing 70 to 90 parts by weight of a methyl (meth)acrylate monomer and 1 part to 20 parts by weight of a $C_2$-$C_{12}$ alkyl (meth)acrylate monomer, based on 100 parts by weight of the total content of the monomer; at a point when a polymerization conversion ratio is 70% to 90% in the polymerization of the core, polymerizing the core by adding and polymerizing 1 part to 10 parts by weight of the methyl (meth)acrylate monomer and 0.04 to 0.7 parts by weight of a polyfunctional acrylic crosslinking agent; and polymerizing a core-shell copolymer by adding and polymerizing 1 to 10 parts by weight of the methyl (meth)acrylate monomer and 1 to 10 parts by weight of an aromatic vinyl monomer in the presence of the core.

13 Claims, No Drawings

… … …

METHOD FOR PREPARING CORE-SHELL COPOLYMER, CORE-SHELL COPOLYMER PREPARED THEREFROM AND RESIN COMPOSITION INCLUDING THE SAME

CROSS-REFERENCE TO RELATED APPLICATIONS

The present application is a national phase entry under 35 U.S.C. § 371 of International Application No. PCT/KR2019/008499 filed on Jul. 10, 2019, which claims priority from Korean Patent Application No. 10-2018-0081388 filed on Jul. 13, 2018, and Korean Patent Application No. 10-2019-0082622 filed on Jul. 9, 2019, the disclosures of which are incorporated herein by reference in their entirety.

TECHNICAL FIELD

The present invention relates to a method for preparing a core-shell copolymer, and more particularly, to a method for preparing a core-shell copolymer having an ultra-high molecular weight, capable of being used as a processing aid in a resin composition, a core-shell copolymer prepared therefrom, and a resin composition including the same.

BACKGROUND ART

A vinyl chloride-based resin is inexpensive and is easy to adjust hardness to thereby have various application fields, and has excellent physical properties and chemical properties to thereby be widely used in various fields. In particular, recently, when preparing a molded article using the vinyl chloride-based resin, there has been a growing interest in foaming molding in order to reduce a weight of the vinyl chloride-based resin and to lower the cost of the molded article.

However, when foaming molding is performed using only the vinyl chloride-based resin, sufficient stretching and melt strength are not able to be obtained at the time of molding, and thus, there are disadvantages in that appearance of the molded article is poor, and foamed cells are large and uneven, resulting in reduction of a foaming ratio.

Therefore, in order to overcome these disadvantages, a method in which an acrylic processing aid including an acrylic copolymer that includes a methyl methacrylate monomer-derived repeating unit as a main component is added to a vinyl chloride-based resin while mixing with a foaming agent, or the like, has been proposed and is generally used.

However, when a molecular weight of the acrylic copolymer is not sufficiently high, there is a problem in that a foaming specific gravity is high at the time of foaming molding, and thus a structure of the foamed cell is not compact.

DISCLOSURE

Technical Problem

An object of the present invention is to provide a core-shell copolymer to improve processability and foaming efficiency when used as a processing aid for a vinyl chloride resin.

That is, the present invention has been made to solve the problems of the background art, and has an object of providing a method for preparing a core-shell copolymer having an ultra-high molecular weight.

Technical Solution

In one general aspect, there is provided a method for preparing a core-shell copolymer, including: polymerizing a core (S10) by polymerizing 70 parts by weight to 90 parts by weight of a methyl (meth)acrylate monomer and 1 part by weight to 20 parts by weight of a $C_2$-$C_{12}$ alkyl (meth)acrylate monomer, based on 100 parts by weight of the total content of the monomer; polymerizing a core (S20) by adding and polymerizing 1 part by weight to 10 parts by weight of the methyl (meth)acrylate monomer and 0.04 parts by weight to 0.7 parts by weight of a polyfunctional acrylic cross-linking agent at a point when a polymerization conversion ratio is 70% to 90% in the polymerization of the core in step (S10); and polymerizing a core-shell copolymer (S30) by adding and polymerizing 1 part by weight to 10 parts by weight of the methyl (meth)acrylate monomer and 1 part by weight to 10 parts by weight of an aromatic vinyl monomer in the presence of the core polymerized in step (S20).

In other general aspect, there is provided a core-shell copolymer including a core and a shell surrounding the core, wherein the core includes 70 wt % to 90 wt % of a methyl (meth)acrylate monomer-derived repeating unit, 1 wt % to 20 wt % of a $C_2$-$C_{12}$ alkyl (meth)acrylate monomer-derived repeating unit, and a polyfunctional acrylic cross-linking agent-derived cross-linking part, the shell includes 1 wt % to 10 wt % of the methyl (meth)acrylate monomer-derived repeating unit and 1 wt % to 10 wt % of an aromatic vinyl monomer-derived repeating unit, and the content of the polyfunctional acrylic cross-linking agent-derived cross-linking part is 0.04 parts by weight to 0.7 parts by weight, based on 100 parts by weight of the total content of the monomer-derived repeating unit, and the core-shell copolymer has a weight average molecular weight of 11,000,000 g/mol or more.

In another general aspect, there is provided a resin composition including the core-shell copolymer as described above and a vinyl chloride resin.

Advantageous Effects

When the core-shell copolymer is prepared according to the present invention, it is possible to prepare a core-shell copolymer having an ultra-high molecular weight, and when the core-shell copolymer thus prepared is used as a processing aid for a vinyl chloride resin, the resin composition has improved processability, excellent foaming efficiency due to low foaming specific gravity, high melt pressure, and an excellent surface property.

BEST MODE

The terms and words used in the present specification and claims should not be interpreted as being limited to typical meanings or dictionary definitions, but should be interpreted as having meanings and concepts meeting the technical ideas of the present invention based on a principle that the inventors can appropriately define the concepts of terms in order to describe their own inventions in the best mode.

Hereinafter, the present invention will be described in more detail to assist in understanding the technical idea of the present invention.

The term "ultra-high molecular weight" used herein may mean a very high molecular weight based on a weight average molecular weight. For example, the ultra-high molecular weight may mean a weight average molecular weight of 15,000,000 g/mol or more, a weight average molecular weight of 15,000,000 g/mol to 20,000,000 g/mol, a weight average molecular weight of 16,000,000 g/mol to 17,000,000 g/mol, a weight average molecular weight of 11,000,000 g/mol or more, a weight average molecular weight of 12,000,000 g/mol to 15,000,000 g/mol, or a weight average molecular weight of 12,000,000 g/mol to 13,500,000 g/mol.

In addition, the term "monomer-derived repeating unit" used herein may refer to a monomer-derived component a structure thereof, or a substance itself. Specific examples thereof may refer to a repeating unit in which the monomer to be added participates in the polymerization reaction and is formed in the polymer, during polymerization of the polymer.

The term "cross-linking agent-derived cross-linking part" used herein may refer to a component derived from compounds used as the cross-linking agent, a structure thereof, or a substance itself, and may refer to a cross-linking part which performs a role of cross-linking in or between polymers formed by the action and reaction of a cross-linking agent.

The term "core" used herein may refer to a polymer component or a copolymer component in which the monomer forming the core is polymerized to form a core or core layer of the core-shell copolymer. The term "shell" used herein may refer to a polymer component or a copolymer component in which the monomers forming the shell is graft polymerized onto the core of the core-shell copolymer to form a shell or shell layer of the core-shell copolymer, where the shell surrounds the core.

A method for preparing a core-shell copolymer according to the present invention may include polymerizing a core (S10) by polymerizing 70 parts by weight to 90 parts by weight of a methyl (meth)acrylate monomer and 1 part by weight to 20 parts by weight of a $C_2$-$C_{12}$ alkyl (meth) acrylate monomer, based on 100 parts by weight of the total content of the monomer; polymerizing a core (S20) by adding and polymerizing 1 part by weight to 10 parts by weight of the methyl (meth)acrylate monomer and 0.04 parts by weight to 0.7 parts by weight of a polyfunctional acrylic cross-linking agent at a point when a polymerization conversion ratio is 70% to 90% in the polymerization of the core in step (S10); and polymerizing a core-shell copolymer (S30) by adding and polymerizing 1 part by weight to 10 parts by weight of the methyl (meth)acrylate monomer and 1 part by weight to 10 parts by weight of an aromatic vinyl monomer in the presence of the core polymerized in step (S20).

That is, the method for preparing the core-shell copolymer according to the present invention may include polymerizing the core stepwise by two steps of (S10) and (S20), and polymerizing the core-shell copolymer by step (S30) in the presence of the core. According to the method for preparing the core-shell copolymer according to the present invention, in the case of preparing of the core-shell copolymer by polymerizing an acrylic copolymer as a main component of the core through step (S10), cross-linking the acrylic copolymer polymerized in step (S10) through step (S20) to prepare a core having an ultra-high molecular weight, and then polymerizing the shell through step (S30) in the presence of the core, when the prepared core-shell copolymer is used as a processing aid at the time of foaming a vinyl chloride resin, a resin composition has improved processability, excellent foaming efficiency due to low foaming specific gravity, high melt pressure, and excellent surface property.

According to an embodiment of the present invention, step (S10), which is a step of polymerizing the core-shell copolymer, may be a step of copolymerizing a methyl (meth)acrylate monomer and a $C_2$-$C_{12}$ alkyl (meth)acrylate monomer.

According to an embodiment of the present invention, in step (S10), the methyl (meth)acrylate monomer may be added in an amount of 70 parts by weight to 90 parts by weight, 70 parts by weight to 85 parts by weight, or 75 parts by weight to 80 parts by weight, based on 100 parts by weight of the total content of the monomer. Within this range, the processability and foaming property are excellent without deteriorating mechanical-physical properties of a molded body which is molded from the resin composition including the core-shell copolymer as the processing aid. In addition, the methyl (meth)acrylate monomer may be a methyl acrylate monomer or a methyl methacrylate monomer, preferably a methyl methacrylate monomer.

In addition, according to an embodiment of the present invention, the $C_2$-$C_{12}$ alkyl (meth)acrylate monomer may be added in an amount of 1 part by weight to 20 parts by weight, 5 parts by weight to 20 parts by weight, 5 parts by weight to 15 parts by weight, or 5 parts by weight to 10 parts by weight, based on 100 parts by weight of the total content of the monomer. Within this range, the foaming specific gravity is low at the time of foaming molding of the resin composition including the core-shell copolymer as a processing aid, while being capable of preparing a core-shell copolymer having an ultra-high molecular weight.

In addition, according to an embodiment of the present invention, the $C_2$-$C_{12}$ alkyl group in the $C_2$-$C_{12}$ alkyl (meth)acrylate monomer may include both a linear $C_2$-$C_{12}$ alkyl group and a branched $C_3$-$C_{12}$ alkyl group. As specific examples, the $C_2$-$C_{12}$ alkyl (meth)acrylate monomer may be ethyl (meth)acrylate, propyl (meth)acrylate, butyl (meth) acrylate, pentyl (meth)acrylate, hexyl (meth)acrylate, heptyl (meth)acrylate, octyl (meth)acrylate, 2-ethylhexyl (meth) acrylate, nonyl (meth)acrylate, decyl (meth)acrylate, undecyl (meth)acrylate, or dodecyl (meth)acrylate. As another example, the alkyl (meth)acrylate monomer may be an alkyl (meth)acrylate monomer containing a $C_2$-$C_{12}$ alkyl group, a $C_2$-$C_8$ alkyl group, or a $C_2$-$C_5$ alkyl group. In addition, the $C_2$-$C_{12}$ alkyl (meth)acrylate monomer may be a $C_2$-$C_{12}$ alkyl acrylate or a $C_2$-$C_{12}$ alkyl methacrylate, and preferably a $C_2$-$C_{12}$ alkyl acrylate monomer.

According to an embodiment of the present invention, the weight average molecular weight of the core polymerized in step (S10) may be 6,100,000 g/mol to 7,000,000 g/mol, 6,500,000 g/mol to 7,000,000 g/mol, or 6,500,000 g/mol to 6,900,000 g/mol. Within this range, according to steps (S20) and (S30), it is possible to polymerize the core-shell copolymer having an ultra-high molecular weight.

According to an embodiment of the present invention, step (S20), which is a step for preparing a core having an ultra-high molecular weight by cross-linking the core component polymerized in step (S10), may be a step of adding and polymerizing the methyl (meth)acrylate monomer and the polyfunctional acrylic cross-linking agent, followed by polymerizing and cross-linking the core.

According to an embodiment of the present invention, step (S20) may be performed when a polymerization conversion ratio of the polymerization in step (S10) is 70% to 90%, 75% to 90%, or 80% to 90%. Within this range, the polymerization in step (S10) is sufficiently performed, and thus the cross-linking by the polyfunctional acrylic cross-linking agent enables preparation of the core-shell copolymer satisfying a desired weight average molecular weight in the present invention, and prevention of the foaming properties from being deteriorated.

Meanwhile, according to an embodiment of the present invention, the polymerization conversion ratio may be calculated by following Equation 1 by taking a certain amount of sample from the copolymer in reaction at regular time intervals, and then measuring the content of solids in the sample:

$$\text{Polymerization conversion ratio (\%)} = (Ms - Mo)/(Mp - M'o) \quad \text{[Equation 1]}$$

wherein Ms is the weight of the dried copolymer, Mo is the sum of the weights of emulsifier and polymerization initiator, Mp is the weight of the 100% polymerized copolymer, and M'o is the sum of the weights of emulsifier and polymerization initiator.

According to an embodiment of the present invention, the methyl (meth)acrylate monomer added in the polymerization of step (S20) may be the same monomer as the methyl (meth)acrylate monomer added in step (S10), and may be added in an amount of 1 part by weight to 10 parts by weight, 3 parts by weight to 8 parts by weight, or 4 parts by weight to 6 parts by weight, based on 100 parts by weight of the total content of the monomer. Within this range, in the polymerization of step (S20), the processability and foaming property are excellent while improving the crosslinkability, without deteriorating mechanical-physical properties of a molded body which is molded from the resin composition including the core-shell copolymer as the processing aid.

In addition, according to an embodiment of the present invention, the polyfunctional acrylic cross-linking agent is a cross-linking agent for cross-linking the core component prepared in step (S10), and may be a 5-functional or higher acrylic cross-linking agent in which 5 or higher acrylic groups, which are cross-linkable moieties in the cross-linking agent, are substituted. Specific examples thereof may be dipentaerythritol pentaacrylate, dipentaerythritol hexaacrylate, or a mixture thereof, preferably dipentaerythritol hexaacrylate. As described above, when a polyfunctional acrylic cross-linking agent is added during polymerization of the core to crosslink the core component, the plurality of core components prepared in step (S10) are simultaneously cross-linked, such that a core-shell copolymer having a desired ultra-high molecular weight in the present invention can be prepared and therefore, the molded body which is molded from the resin composition including the core-shell copolymer as the processing aid has an excellent foaming property.

According to an embodiment of the present invention, the polyfunctional acrylic cross-linking agent added in step (S20) may be added in an amount of 0.04 parts by weight to 0.7 parts by weight, 0.05 parts by weight to 0.6 parts by weight, or 0.05 parts by weight to 0.5 parts by weight, based on 100 parts by weight of the total content of the monomer. Within this range, it is possible to prepare the core having an ultra-high molecular weight, and to prevent gelation of the core-shell copolymer.

According to an embodiment of the present invention, the weight average molecular weight of the core prepared in step (S20) may be 15,000,000 g/mol or more, 16,000,000 g/mol to 20,000,000 g/mol, or 16,000,000 g/mol to 17,000,000 g/mol. Within this range, when the core-shell copolymer is used as a processing aid for a vinyl chloride resin, the processability is improved, the foaming efficiency is excellent due to low foaming specific gravity, and the extrusion amount is excellent.

According to an embodiment of the present invention, step (S30) may be a step of preparing the core-shell copolymer by forming the shell surrounding the core polymerized in the step (S20), and may be performed after the polymerization of the core of the step (S20) is completed.

According to an embodiment of the present invention, the methyl (meth)acrylate monomer added in step (S30) may be the same monomer as the methyl (meth)acrylate monomer added in steps (S10) and (S20). The methyl (meth)acrylate monomer may be added in an amount of 1 part by weight to 10 parts by weight, 3 parts by weight to 8 parts by weight, or 4 parts by weight to 6 parts by weight, based on 100 parts by weight of the total content of the monomer. Within this range, the processability and surface property are excellent without deteriorating mechanical-physical properties of a molded body which is molded from the resin composition including the core-shell copolymer as the processing aid.

In addition, according to an embodiment of the present invention, the aromatic vinyl monomer added in step (S30) may be at least one selected from the group consisting of styrene, α-methylstyrene, 3-methylstyrene, 4-methylstyrene, 4-propylstyrene, 1-vinylnaphthalene, 4-cyclohexylstyrene, 4-(p-methylphenyl) styrene, and 1-vinyl-5-hexylnaphthalene. The aromatic vinyl monomer may be added in an amount of 1 part by weight to 10 parts by weight, 3 parts by weight to 8 parts by weight, or 4 parts by weight to 6 parts by weight, based on 100 parts by weight of the total content of the monomer. Within this range, gel formation is prevented, and thus the molded body molded from the resin composition including the core-shell copolymer as a processing aid has excellent processability.

According to an embodiment of the present invention, the weight average molecular weight of the core-shell copolymer prepared in step (S30) may be 11,000,000 g/mol or more, 12,000,000 g/mol to 15,000,000 g/mol, or 12,000,000 g/mol to 13,500,000 g/mol. Within this range, when the core-shell copolymer is used as a processing aid for a vinyl chloride resin, the processability is improved, the foaming efficiency is excellent due to low foaming specific gravity, and the extrusion amount is excellent. Meanwhile, in the core-shell copolymer prepared in step (S30), the shell shows a low weight average molecular weight due to the fast polymerization rate. Therefore, although the weight average molecular weight of the core is high, the weight average molecular weight of the core-shell copolymer calculated according to the weight ratio between the core and the shell may be lower than the weight average molecular weight of the core.

Meanwhile, in steps (S10), (S20), and (S30), the term "total content of the monomer" may refer to the total content of the monomers to be added in the preparation of the core and the core-shell copolymer according to the present invention. For example, the total content of the monomer may be a total content of the methyl (meth)acrylate monomer, the $C_2$-$C_{12}$ alkyl (meth)acrylate monomer, and the aromatic vinyl monomer which are added in steps (S10), (S20), and (S30).

According to an embodiment of the present invention, the total of the content of the methyl (meth)acrylate monomer and the $C_2$-$C_{12}$ alkyl (meth)acrylate monomer added in step (S10), the content of the methyl (meth)acrylate monomer added in step (S20), and the content of the methyl (meth)acrylate monomer and the aromatic vinyl monomer added n step (S30) may be 100 parts by weight. That is, the total of the content of the methyl (meth)acrylate monomer (added in step (S10)), the content of the $C_2$-$C_{12}$ alkyl (meth)acrylate monomer (added in step (S10)), the content of the methyl (meth)acrylate monomer (added in step (S20)), the methyl (meth)acrylate monomer (added in step (S30)), and the aromatic vinyl monomer (added in step (S30)) may be 100 parts by weight, based on 100 parts by weight of the total content of the monomer.

According to an embodiment of the present invention, the polymerization of steps (S10), (S20), and (S30) may be performed in the presence of the methyl (meth)acrylate monomer, the $C_2$-$C_{12}$ alkyl (meth)acrylate monomer, and the aromatic vinyl monomer by radical polymerization using a peroxide-based, redox, or azo-based initiator. As the polymerization method, emulsion polymerization, bulk polymerization, solution polymerization, or suspension polymerization may be used. In terms of preparing the core-shell copolymer having an ultra-high molecular weight according to the present invention, the polymerization may be performed by the emulsion polymerization, and thus the polymerization may be performed by including an emulsifier. In addition, the core-shell copolymer prepared in step (S30) may be obtained in the form of the core-shell copolymer latex in which the core-shell copolymer is dispersed in a solvent. In order to obtain the core-shell copolymer in the form of a powder from the core-shell copolymer latex, aggregation, aging, dehydration and drying processes, or the like, may be performed.

In addition, according to the present invention, there is provided a core-shell copolymer prepared by the method for preparing the core-shell copolymer. The core-shell copolymer includes a core and a shell surrounding the core, wherein the core includes 70 wt % to 90 wt % of a methyl (meth)acrylate monomer-derived repeating unit, 1 wt % to 20 wt % of a $C_2$-$C_{12}$ alkyl (meth)acrylate monomer-derived repeating unit, and a polyfunctional acrylic cross-linking agent-derived cross-linking part, the shell includes 1 wt % to 10 wt % of the methyl (meth)acrylate monomer-derived repeating unit and 1 wt % to 10 wt % of an aromatic vinyl monomer-derived repeating unit, and the content of the polyfunctional acrylic cross-linking agent-derived cross-linking part is 0.04 parts by weight to 0.7 parts by weight, based on 100 parts by weight of the total content of the monomer-derived repeating unit, and the core-shell copolymer has a weight average molecular weight of 11,000,000 g/mol or more.

According to an embodiment of the present invention, the methyl (meth)acrylate monomer-derived repeating unit of the core may be a repeating unit formed by polymerizing the methyl (meth)acrylate monomer added in steps (S10) and (S20) of the method for preparing the core-shell copolymer according to the present invention, the $C_2$-$C_{12}$ alkyl (meth) acrylate monomer-derived repeating unit may be a repeating unit formed by polymerizing the $C_2$-$C_{12}$ alkyl (meth)acrylate monomer added in step (S10) of the method for preparing the core-shell copolymer according to the present invention, and the polyfunctional acrylic cross-linking agent-derived cross-linking part may be a cross-linking part in the form in which the polyfunctional acrylic cross-linking agent added in step (S20) of the method for preparing the core-shell copolymer according to the present invention is subjected to cross-linking the core and the shell, or the plurality of core components polymerized in step (S10).

In addition, according to an embodiment of the present invention, the methyl (meth)acrylate monomer-derived repeating unit of the shell may be a repeating unit formed by polymerizing the methyl (meth)acrylate monomer added in step (S30) of the method for preparing the core-shell copolymer according to the present invention, and the aromatic monomer-derived repeating unit may be a repeating unit formed by polymerizing the aromatic monomer added in step (S30) of the method for preparing the core-shell copolymer according to the present invention.

According to an embodiment of the present invention, the methyl (meth)acrylate monomer-derived repeating unit of the core in the core-shell copolymer may be added in an amount of 70 wt % to 90 wt %, 80 wt % to 90 wt %, or 85 wt % to wt %, based on the total content of monomer-derived repeating unit included in the core-shell copolymer, the $C_2$-$C_{12}$ alkyl (meth)acrylate monomer-derived repeating unit of the core in the core-shell copolymer may be added in an amount of 1 wt % to 20 wt %, 5 wt % to 20 wt %, 5 wt % to 15 wt %, or 5 wt % to 10 wt %, based on the total content of monomer-derived repeating unit included in the core-shell copolymer, and the polyfunctional acrylic cross-linking agent-derived cross-linking part of the core in the core-shell copolymer may be added in an amount of 0.04 parts by weight to 0.7 parts by weight, 0.05 parts by weight to 0.6 parts by weight, or 0.05 parts by weight to 0.5 parts by weight, based on the total content of monomer-derived repeating unit included in the core-shell copolymer. Within this range, foaming specific gravity is low at the time of foaming molding of the resin composition including the core-shell copolymer as a processing aid.

In addition, according to an embodiment of the present invention, the methyl (meth)acrylate monomer-derived repeating unit of the shell in the core-shell copolymer may be in an amount of 1 wt % to 10 wt %, 3 wt % to 8 wt %, or 4 wt % to 6 wt %, based on the total content of monomer-derived repeating unit included in the core-shell copolymer, and the aromatic vinyl monomer-derived repeating unit of the shell in the core-shell copolymer may be in an amount of 1 wt % to 10 wt %, 3 wt % to 8 wt %, or 4 wt % to 6 wt %, based on the total content of monomer-derived repeating unit included in the core-shell copolymer. Within this range, the processability and surface property are excellent without deteriorating mechanical-physical properties of a molded body which is molded from the resin composition including the core-shell copolymer as the processing aid.

In addition, according to an embodiment of the present invention, the content of each monomer-derived repeating unit of the core-shell copolymer may be an average content of the entire core-shell copolymer prepared.

According to an embodiment of the present invention, the weight average molecular weight of the core-shell copolymer may be 11,000,000 g/mol or more, 12,000,000 g/mol to 15,000,000 g/mol, or 12,000,000 g/mol to 13,500,000 g/mol. Within this range, when the core-shell copolymer is used as a processing aid for a vinyl chloride resin, the processability is improved, the foaming efficiency is excellent due to low foaming specific gravity, and the extrusion amount is excellent.

In addition, according to the present invention, there is provided a resin composition including the core-shell copolymer. The resin composition may include the core-shell copolymer according to the present invention and a vinyl chloride resin. That is, the resin composition may be a vinyl chloride-based resin composition, and the vinyl chloride-based resin composition may be a vinyl chloride-based resin composition for foaming.

According to an embodiment of the present invention, the vinyl chloride resin may be not particularly limited as long as the vinyl chloride resin may be used for foaming. Meanwhile, the resin composition may include 1 part by weight to 20 parts by weight, 1 part by weight to 10 parts by weight, or 3 parts by weight to 8 parts by weight of the core-shell copolymer, based on 100 parts by weight of the vinyl chloride resin. Within this range, the resin composition has excellent processability, extrusion amount, and foaming properties.

The resin composition according to the present invention may further include, in addition to the vinyl chloride resin and the core-shell copolymer, additives such as a foaming agent, a stabilizer, a processing aid, a heat stabilizer, a lubricant, a pigment, a dye, and an antioxidant, within a range in which physical properties are not deteriorated, if necessary.

Hereinafter, the present invention will be described in detail with reference to the following Examples. However, the following Examples describe the present invention by way of example only. It is apparent to those skilled in the art that various changes and modifications can be made in the scope and spirit of the present invention and that the present invention is not limited thereto.

EXAMPLE

Example 1

Polymerization of Core: Step 1

A four-necked flask reactor equipped with a stirrer, a thermometer, a nitrogen inlet, and a circulating condenser was prepared, 100 parts by weight of deionized water (DDI water), 0.002 parts by weight of ferrous sulfate, and 0.04 part by weight of disodium ethylenediaminetetraacetate were added thereto, and then an internal temperature of the reactor was maintained at 40° C. under a nitrogen atmosphere.

At the same time, 70 parts by weight of deionized water, 0.8 part by weight of sodium lauryl sulfate as an emulsifier, 75 parts by weight of methyl methacrylate (MMA), and 10 parts by weight of butyl acrylate (BA) were added to prepare a monomer pre-emulsion. When an internal temperature of the reactor reached 40° C., 0.001 parts by weight of tert-butyl hydroperoxide and 0.02 parts by weight of sodium formaldehyde sulfoxylate as initiators were added to the reactor at one time, together with the prepared monomer pre-emulsion, and the reaction was allowed to proceed.

Polymerization of Core: Step 2

After the initiation of the reaction, at a point when a polymerization conversion ratio was 90%, 0.05 parts by weight of dipentaerythritol hexaacrylate (DPHA) as a polyfunctional acrylic cross-linking agent and 5 parts by weight of methyl methacrylate (MMA) were added at one time, and 0.003 parts by weight of tert-butyl hydroperoxide and 0.03 parts by weight of sodium formaldehyde sulfoxylate as initiators were added at one time, and the reaction was allowed to proceed for 3 hours.

Polymerization of Core-Shell Copolymer: Step 3

Then, after completion of the polymerization of the core, 5 parts by weight of methyl methacrylate (MMA) and 5 parts by weight of styrene (SM) were added at one time, and 0.001 parts by weight of tert-butyl hydroperoxide and 0.03 parts by weight of sodium formaldehyde sulfoxylate as initiators were added at one time, and the reaction was allowed to proceed for 1 hour.

The total solid contents (TSC) of the core-shell copolymer latex prepared through the reaction was 35 wt %, and the average particle diameter of the core-shell copolymer in the latex was 150 nm.

Preparation of Core-Shell Copolymer Powder

Then, in order to obtain the core-shell copolymer in the form of a powder, the resulting core-shell copolymer latex was diluted with deionized water to a total solid content of 15 wt % based on the solid content, and a temperature of the core-shell copolymer latex was raised to 80° C. to 85° C. Subsequently, based on 100 parts by weight of the core-shell copolymer latex, 6 parts by weight of an aqueous magnesium sulfate solution (concentration of 10 wt %) was added at one time to induce agglomeration, thereby obtaining a slurry. The resulting slurry was then washed with ion-exchanged water 2 to 3 times to wash the by-products, the washing water was removed through filtration, followed by drying at 80° C. for 3 hours using a small fluidized-bed dryer to obtain a core-shell copolymer powder sample.

Example 2

Example 2 was performed in the same manner as in Example 1, except that dipentaerythritol hexaacrylate (DPHA) was added at 0.5 parts by weight instead of 0.05 parts by weight in the polymerization of step 2 of the polymerization of the core.

Example 3

Example 3 was performed in the same manner as in Example 1, except that methyl methacrylate (MMA) was added at 80 parts by weight instead of 75 parts by weight and butyl acrylate (BA) was added at 5 parts by weight instead of 10 parts by weight in the polymerization of step 1 of the polymerization of the core.

Example 4

Example 4 was performed in the same manner as in Example 3, except that dipentaerythritol hexaacrylate (DPHA) was added at 0.25 parts by weight instead of 0.05 parts by weight in the polymerization of step 2 of the polymerization of the core.

Example 5

Example 5 was performed in the same manner as in Example 3, except that dipentaerythritol hexaacrylate (DPHA) was added at 0.5 parts by weight instead of 0.05 parts by weight in the polymerization of step 2 of the polymerization of the core.

Example 6

Example 6 was performed in the same manner as in Example 1, except that dipentaerythritol pentaacrylate (DPPA) was added instead of dipentaerythritol hexaacrylate (DPHA) used in the polymerization of step 2 of the polymerization of the core.

Comparative Example 1

Comparative Example 1 was performed in the same manner as in Example 1, except that methyl methacrylate (MMA) was added at 40 parts by weight instead of 75 parts by weight and butyl acrylate (BA) was added at 45 parts by weight instead of 10 parts by weight in the polymerization if step 1 of the polymerization of the core.

Comparative Example 2

Comparative Example 2 was performed in the same manner as in Example 1, except that no dipentaerythritol hexaacrylate (DPHA) was added in the polymerization of step 2 of the polymerization of the core.

Comparative Example 3

Comparative Example 3 was performed in the same manner as in Example 1, except that dipentaerythritol hexaacrylate (DPHA) was added at 0.01 parts by weight instead of 0.05 parts by weight in the polymerization of step 2 of the polymerization of the core.

Comparative Example 4

Comparative Example 4 was performed in the same manner as in Example 1, except that no methyl methacrylate (MMA) was added in the polymerization of step 2 of the polymerization of the core. The total content of the monomer added in Comparative Example 4 was 95 parts by weight, based on 100 parts by weight of the total content of the monomer of Example 3.

Comparative Example 5

Comparative Example 5 was performed in the same manner as in Example 3, except that dipentaerythritol hexaacrylate (DPHA) was added at 1.0 part by weight instead of 0.05 parts by weight in the polymerization of step 2 of the polymerization of the core.

Comparative Example 6

Comparative Example 6 was performed in the same manner as in Example 1, except that methyl methacrylate (MMA) was added at 85 parts by weight instead of 75 parts by weight and butyl acrylate (BA) was added at 5 parts by weight instead of 10 parts by weight in the polymerization of step of the polymerization of the core; dipentaerythritol hexaacrylate (DPHA) was added at 0.5 parts by weight instead of 0.05 parts by weight in step 2 of the polymerization of the core; and no styrene (SM) was added in the polymerization of step 3 of polymerization of core-shell copolymer.

Comparative Example 7

Comparative Example 7 was performed in the same manner as in Example 1, except that methyl methacrylate (MMA) was added at 90 parts by weight instead of 75 parts by weight and butyl acrylate (BA) was added at 5 parts by weight instead of 10 parts by weight in the polymerization of step 1 of the polymerization of the core; dipentaerythritol hexaacrylate (DPHA) was added at 0.5 parts by weight instead of 0.05 parts by weight in step 2 of the polymerization of the core; and neither methyl methacrylate (MMA) nor styrene (SM) was added in the polymerization of step 3 of core-shell copolymer.

Comparative Example 8

Comparative Example 8 was performed in the same manner as in Example 4, except that step 2 of the polymerization of the core was performed at a point when a polymerization conversion ratio was 40%.

Comparative Example 9

Comparative Example 9 was performed in the same manner as in Example 4, except that the polymerization of step 2 of the polymerization of the core was performed at a point when a polymerization conversion ratio was 97%.

Comparative Example 10

Comparative Example 10 was performed in the same manner as in Example 4, except that methyl methacrylate (MMA) was added at 85 parts by weight instead of 80 parts by weight, and no butyl acrylate (BA) was added in the polymerization of step 1 of the polymerization of the core.

Comparative Example 11

Comparative Example 11 was performed in the same manner as in Example 4, except that no methyl methacrylate (MMA) was added and butyl acrylate (BA) was added at 85 parts by weight instead of 5 parts by weight in the polymerization of step 1 of the polymerization of the core.

Comparative Example 12

Comparative Example 12 was performed in the same manner as in Example 1, except that tetraethylene glycol diacrylate (TTEGDA) was added instead of dipentaerythritol hexaacrylate (DPHA) used in the polymerization of step 2 of the polymerization of the core.

Experimental Example Experimental Example 1 In the polymerization of the core-shell copolymers in Examples 1 to 6 and Comparative Examples 1 to 12, each weight average molecular weight of the core and the core-shell copolymers prepared in Steps 1, 2, and 3 was measured by the following method, and is shown in Tables 1 and 2 together with the content (part by weight) of the monomer and the polyfunctional acrylic cross-linking agent to be added in each step.

Weight average molecular weight (Mw, ×10$^4$ g/mol): the sample in the form of powder was dissolved in a tetrahydrofuran (THF) solvent at a concentration of 0.25 wt %, and the weight average molecular weight was measured using gel permeation chromatography.

TABLE 1

| Classification | | Example | | | | | |
|---|---|---|---|---|---|---|---|
| | | 1 | 2 | 3 | 4 | 5 | 6 |
| Step 1 | MMA | 75 | 75 | 80 | 80 | 80 | 75 |
| | BA | 10 | 10 | 5 | 5 | 5 | 10 |
| | Mw | 650 | 650 | 690 | 690 | 690 | 660 |
| Step 2 | DPHA or DPPA | 0.05 | 0.5 | 0.05 | 0.25 | 0.5 | 0.05 |
| | MMA | 5 | 5 | 5 | 5 | 5 | 5 |
| | Mw | 1600 | 1600 | 1700 | 1700 | 1650 | 1600 |
| Step 3 | MMA | 5 | 5 | 5 | 5 | 5 | 5 |
| | SM | 5 | 5 | 5 | 5 | 5 | 5 |
| | Mw | 1200 | 1200 | 1300 | 1350 | 1300 | 1200 |
| | Total content of monomers | 100 | 100 | 100 | 100 | 100 | 100 |

TABLE 2

| Classification | | Comparative Example | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| Step 1 | MMA | 40 | 75 | 75 | 80 | 80 | 85 | 90 | 80 | 80 | 85 | — | 75 |
| | BA | 45 | 10 | 10 | 5 | 5 | 5 | 5 | 5 | 5 | — | 85 | 10 |
| | Mw | 550 | 660 | 660 | 690 | 690 | 690 | 690 | 450 | 690 | 400 | 750 | 660 |
| Step 2 | DPHA or TTEG DA | 0.05 | — | 0.01 | 0.05 | 1.0 | 0.5 | 0.5 | 0.25 | 0.25 | 0.25 | 0.25 | 0.05 |
| | MMA | 5 | 5 | 5 | — | 5 | 5 | 5 | 5 | 5 | 5 | 5 | 5 |
| | Mw | 1200 | 900 | 1000 | 800 | 1600 | 1700 | 1400 | 920 | 750 | 900 | 1800 | 1000 |
| Step 3 | MMA | 5 | 5 | 5 | 5 | 5 | 5 | — | 5 | 5 | 5 | 5 | 5 |
| | SM | 5 | 5 | 5 | 5 | 5 | — | 5 | 5 | 5 | 5 | 5 | 5 |
| | Mw | 800 | 650 | 700 | 550 | 1300 | 1300 | 1350 | 600 | 520 | 580 | 1400 | 700 |
| Total content of monomers | | 100 | 100 | 100 | 95 | 100 | 100 | 100 | 100 | 100 | 100 | 100 | 100 |

As shown in Table 1, it could be confirmed that the core-shell copolymers of Examples 1 to 6 prepared according to the present invention had a weight average molecular weight of $1,200 \times 10^4$ g/mol or more after step 3 of the polymerization.

Meanwhile, in Comparative Example 1 in which methyl methacrylate was not added sufficiently but butyl acrylate was added in an excessive content, it could be confirmed that the weight average molecular weight was not sufficiently increased even through the polyfunctional acrylic cross-linking agent of the same content as in Example 1 was added. In Comparative Example 2 in which no polyfunctional acrylic cross-linking agent was added, Comparative Example 3 in which a small amount of polyfunctional acrylic cross-linking agent was added, Comparative Example 4 in which no methyl methacrylate monomer was added together with the polyfunctional acrylic cross-linking agent, Comparative Examples 8 and 9 in which the polyfunctional acrylic cross-linking agent was added at a time point outside the time point defined by the present invention even though the polyfunctional acrylic cross-linking agent was added, and Comparative Example 10 in which no butyl acrylate was added as a monomer in the polymerization of the core, it could be confirmed that the weight average molecular weight was not increased. Furthermore, in Comparative Example 12 using tetraethylene glycol diacrylate (TTEGDA) in which the number of acrylate functional groups is not sufficient as the polyfunctional acrylic cross-linking agent, after step 3 of the polymerization, it could be confirmed that the core-shell copolymer had a molecular weight of $700 \times 10^4$ g/mol, resulting in insufficient performance as a cross-linking agent.

Experimental Example 2

In order to evaluate foaming processing-property when the core-shell copolymer was used as a processing aid for a vinyl chloride resin, 5 parts by weight of a composite stabilizer (product name: KD-105, manufactured by Dansuk Industrial Co., Ltd.), 7 parts by weight of calcium carbonate ($CaCO_3$) as a filler, 2 parts by weight of titanium dioxide ($TiO_2$), and 0.2 part by weight of a wax-type lubricant (product name: AC316A) were added to 100 parts by weight of the vinyl chloride resin (product name: LS080, manufactured by LG Chem Co., Ltd.), and then 5 parts by weight of each of the core-shell copolymers prepared in Examples 1 to 6 and Comparative Examples 1 to 12 and 0.8 part by weight of azodicarbonamide as a foaming agent were added thereto. The mixture was mixed using a Henschel mixer while heating up to 110° C. to prepare a vinyl chloride-based resin composition containing the core-shell copolymer. Then, physical properties related to foaming property, the processability and melt pressure were measured by the following manners and are shown in Tables 3 and 4.

Foaming specific gravity (g/cm³) and surface property: a foaming density of a foam molded body cut into a size of 30 mm after foaming the above-prepared vinyl chloride-based resin composition for 1 minute using a Haake twin extruder at a cylinder temperature of 180° C., a screw speed of 30 rpm, and a slit die size of 2 mm (thickness)×30 mm (width) was used to measure a foaming specific gravity using a plastic specific gravity meter. Here, the higher the foaming specific gravity, the lower the foaming magnification, which indicates that the foaming property was deteriorated.

In addition, surface property was evaluated from 1 point to 5 points by visually observing a surface state of the foam molded body obtained from the above, and determining a case where there was no die mark and no flow mark and the thickness was uniform as 5 points, a case where the die mark and the flow mark were partially present and the thickness was not uniform as 3 points, and a case where the die mark and the flow mark were mostly present and the thickness was not uniform at all as 1 point.

Extrusion amount (g/min) and melt pressure (bar): an extrusion amount and a melt pressure during extrusion were measured by extruding the above-prepared vinyl chloride-based resin composition using a Haake twin extruder at a temperature of 180° C. for the cylinder 1, 185° C. for the cylinder 2, 185° C. for the cylinder 3, and 190° C. for a die, and at a screw speed of 40 rpm. The higher the extrusion amount, the more the extrusion amount, which indicates excellent foam processability. The melt pressure is a factor proportional to the melt viscosity, and the higher the melt pressure, the higher the melt viscosity, which indicates excellent foam processability.

TABLE 3

| Classification | Example | | | | | |
|---|---|---|---|---|---|---|
| | 1 | 2 | 3 | 4 | 5 | 6 |
| Foaming specific gravity | 0.44 | 0.45 | 0.42 | 0.43 | 0.44 | 0.44 |
| Surface property | 5 | 5 | 4 | 4 | 4 | 5 |
| Extrusion amount | 88 | 87 | 88 | 89 | 88 | 88 |
| Melt pressure | 127 | 127 | 128 | 128 | 128 | 127 |

TABLE 4

| Classification | Comparative Example | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Foaming specific gravity | 0.52 | 0.57 | 0.53 | 0.68 | 0.55 | 0.46 | 0.45 | 0.57 | 0.58 | 0.57 | 0.65 | 0.53 |
| Surface property | 5 | 5 | 5 | 4 | 1 | 3 | 3 | 5 | 5 | 5 | 1 | 5 |
| Extrusion amount | 84 | 87 | 84 | 85 | 80 | 75 | 75 | 87 | 89 | 88 | 60 | 83 |
| Melt pressure | 108 | 115 | 116 | 100 | 116 | 125 | 130 | 110 | 112 | 111 | 150 | 116 |

As shown in Tables 3 and 4, when the core-shell copolymer prepared according to the present invention was used as the processing aid, it could be confirmed that the foaming specific gravity was low, the extrusion amount was high, and the cell uniformity and surface property of the foam molded body were excellent.

Meanwhile, in Comparative Example 1 in which methyl methacrylate was not added sufficiently but butyl acrylate was added in an excessive content, it could be confirmed that since the weight average molecular weight was not sufficiently increased, the foaming specific gravity was high and the melt pressure was low. In Comparative Example 2 in which no polyfunctional acrylic cross-linking agent was added, Comparative example 3 in which a small amount of polyfunctional acrylic cross-linking agent was added, Comparative Example 4 in which no methyl methacrylate monomer was added together with the polyfunctional acrylic cross-linking agent, Comparative Examples 8 and 9 in which the polyfunctional acrylic cross-linking agent was added at a time point outside the time point defined by the present invention even though the polyfunctional acrylic cross-linking agent was added, and Comparative Example 10 in which no butyl acrylate was added as a monomer in the polymerization of the core, it could be confirmed that as the weight average molecular weight was not increased, the foam specific gravity was high, and the extrusion amount and the melt pressure were reduced.

In addition, in Comparative Example 5 in which an excessive amount of the polyfunctional acrylic cross-linking agent was added, it could be confirmed that the weight average molecular weight of the prepared copolymer was shown to be similar to the Example, but the foaming specific gravity was high, the extrusion amount was low, the die mark and the flow mark appeared, and the thickness was not uniform, such that the surface property was very poor.

In addition, in the shell preparation of the core-shell copolymer, also in Comparative Example 6 in which no styrene monomer was added and Comparative Example 7 in which neither the methyl methacrylate monomer nor the styrene monomer was added, it could be confirmed that the weight average molecular weight of the prepared copolymer was shown to be similar to the Example, but the extrusion amount was drastically reduced, such that the processability was poor, the die mark and the flow mark were partially present, and the thickness was not uniform, such that the surface property was also poor.

In addition, in the polymerization of step 1 of the polymerization of the core, in Comparative Example 11 in which only butyl acrylate was added without adding methyl methacrylate as the monomer, it could be confirmed that the weight average molecular weight of the core-shell copolymer was high, but the foaming specific gravity, the surface property, and extrusion amount were extremely poor.

Furthermore, in Comparative Example 12 in which tetraethylene glycol diacrylate (TTEGDA) was used as the polyfunctional acrylic cross-linking agent, the weight average molecular weight was not sufficiently increased, such that the foaming specific gravity was high, and the properties related to the extrusion amount and the melt pressure were also reduced.

Experimental Example 3

In order to evaluate adhesion property when the core-shell copolymer was used as the processing aid for a vinyl chloride resin, 100 parts by weight of a vinyl chloride resin (product name: LS080, manufactured by LG Chem Co., Ltd., degree of polymerization: 800), 3 parts by weight of a tin-based stabilizer, 0.9 part by weight of calcium stearate were added to a Henschel mixer at room temperature, and mixed at a stirring rate of 1,000 rpm while heating up to 115° C., and then cooled up to 40° C., thereby preparing a master batch. To the master batch, 3 parts by weight of each of the core-shell copolymers prepared in Examples 1 to 6 and Comparative Examples 1 to 12 was added, and further mixed at room temperature. Then, the adhesion property on a roll surface was evaluated from 1 point to 5 points by milling 100 parts by weight of the powder mixture for 4 minutes using a 6-inch 2-roll mill under conditions of a roll mixing temperature of 200° C., a roll rotation number of 14×15 rpm, and a roll interval of 0.3 mm, and determining a case where there was no elongation at all while peeling as 5 points, a case where the elongation was hardly observed while peeling as 4 points, a case where the elongation was partially observed while peeling as 3 points, a case where the elongation was mostly observed while peeling as 2 points, and a case where the peeling was not performed as 1 point. These are shown in Tables 5 and 6.

TABLE 5

| Classification | Example | | | | | |
|---|---|---|---|---|---|---|
| | 1 | 2 | 3 | 4 | 5 | 6 |
| Adhesion property | 5 | 5 | 5 | 5 | 5 | 3 |

TABLE 6

| Classification | Comparative Example | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Adhesion property | 5 | 5 | 5 | 5 | 4 | 3 | 3 | 5 | 5 | 4 | 2 | 4 |

As shown in Tables 5 and 6, when the core-shell copolymer prepared according to the present invention was used as the processing aid, it could be confirmed that the adhesion property was excellent. However, in Comparative Example 6 in which dipentaerythritol pentaacrylate (DPAA) was used as the polyfunctional acrylic cross-linking agent, it could be confirmed that the adhesion property was somewhat inferior to Examples 1 to 5 in which dipentaerythritol hexaacrylate (DPHA) was used.

Meanwhile, in Comparative Example 5 in which an excessive amount of the polyfunctional acrylic cross-linking agent was added, Comparative Example 6 in which no styrene monomer was added in the shell polymerization of the core-shell copolymer, and Comparative Example 7 in which neither methyl methacrylate monomer nor styrene monomer was added, it could be confirmed that the gel was formed, thereby deteriorating the adhesion property.

It was confirmed from the above-described results that the present inventors found that when the core-shell copolymer having an ultra-high molecular weight was prepared according to the present invention and the prepared core-shell copolymer having an ultra-high molecular weight was used as a processing aid for a vinyl chloride resin, the foaming efficiency was excellent due to low foaming specific gravity, the processability was excellent, the cells of the molded body were uniform, and the surface property was excellent.

The invention claimed is:

1. A method for preparing a core-shell copolymer comprising:
   polymerizing a core by polymerizing 70 parts by weight to 90 parts by weight of a methyl (meth)acrylate monomer and 1 part by weight to 20 parts by weight of a $C_2$-$C_{12}$ alkyl (meth)acrylate monomer, based on 100 parts by weight of a total content of the monomer added to prepare the core-shell copolymer;
   at a point when a polymerization conversion ratio is 70% to 90% in the polymerization of the core adding and polymerizing 1 part by weight to 10 parts by weight of the methyl (meth)acrylate monomer and 0.04 parts by weight to 0.7 parts by weight of a polyfunctional acrylic cross-linking agent, based on 100 parts by weight of the total content of the monomer added to prepare the core-shell copolymer; and
   adding and polymerizing 1 part by weight to 10 parts by weight of the methyl (meth)acrylate monomer and 1 part by weight to 10 parts by weight of an aromatic vinyl monomer, based on 100 parts by weight of the total content of the monomer added to prepare the core-shell copolymer, in the presence of the core to polymerize the core-shell copolymer.

2. The method of claim 1, wherein the polyfunctional acrylic cross-linking agent is dipentaerythritol pentaacrylate, dipentaerythritol hexaacrylate, or a mixture thereof.

3. The method of claim 1, wherein the polyfunctional acrylic cross-linking agent is dipentaerythritol hexaacrylate.

4. The method of claim 1, wherein an amount of the polyfunctional acrylic cross-linking agent added is 0.05 parts by weight to 0.5 parts by weight.

5. The method of claim 1, wherein the adding and polymerizing the methyl (meth)acrylate monomer and the polyfunctional acrylic cross-linking agent is performed at a point when the polymerization conversion ratio is 80% to 90% in the polymerization of the core.

6. The method of claim 1, wherein the core prepared by adding and polymerizing the methyl (meth)acrylate monomer and the polyfunctional acrylic cross-linking agent at the point when the polymerization conversion ration is 70% to 90% in the polymerization of the core has a weight average molecular weight of 15,000,000 g/mol or more.

7. The method of claim 1, wherein the core prepared by adding and polymerizing the methyl (meth)acrylate monomer and the polyfunctional acrylic cross-linking agent at the point when the polymerization conversion ratio is 70% to 90% in the polymerization of the core has a weight average molecular weight of 16,000,000 g/mol to 17,000,000 g/mol.

8. The method of claim 1, wherein in the polymerizing the core, an amount of the methyl (meth)acrylate monomer added is 75 parts by weight to 80 parts by weight and the amount of the $C_2$-$C_{12}$ alkyl (meth)acrylate added is 5 parts by weight to 10 parts by weight.

9. The method of claim 1, wherein in the adding and polymerizing the methyl (meth)acrylate monomer and the polyfunctional acrylic cross-linking agent at the point when the polymerization conversion ratio is 70% to 90% in the polymerization of the core, an amount of the methyl (meth)acrylate monomer added is 4 parts by weight to 6 parts by weight.

10. The method of claim 1, wherein in the polymerizing the core-shell copolymer, an amount of the methyl (meth)acrylate monomer added is 4 parts by weight to 6 parts by weight and an amount of the aromatic vinyl monomer added is 4 parts by weight to 6 parts by weight.

11. A core-shell copolymer, comprising a core and a shell surrounding the core,
   wherein the core includes 70 wt % to 90 wt % of a methyl (meth)acrylate monomer-derived repeating unit, 1 wt % to 20 wt % of a $C_2$-$C_{12}$ alkyl (meth)acrylate monomer-derived repeating unit, and a polyfunctional acrylic cross-linking agent-derived cross-linking part, based on 100 wt % by weight of a total content of the monomer-derived repeating unit of the core-shell copolymer,
   the shell includes 1 wt % to 10 wt % of the methyl (meth)acrylate monomer-derived repeating unit and 1 wt % to 10 wt % of an aromatic vinyl monomer-derived repeating unit, based on 100 wt % by weight of a total content of the monomer-derived repeating unit of the core-shell copolymer.
   a content of the polyfunctional acrylic cross-linking agent-derived cross-linking part is 0.04 parts by weight to 0.7 parts by weight, based on 100 parts by weight of a total content of the monomer-derived repeating unit of the core-shell copolymer, and
   the core-shell copolymer has a weight average molecular weight of 11,000,000 g/mol or more.

12. The core-shell copolymer of claim 11, wherein the core-shell copolymer has a weight average molecular weight of 12,000,000 g/mol to 13,500,000 g/mol.

13. A resin composition comprising the core-shell copolymer of claim 11 and a vinyl chloride resin.

* * * * *